Patented Nov. 18, 1947

2,430,919

UNITED STATES PATENT OFFICE 2,430,919

PLASTICIZED POLYVINYL ALCOHOL

Charles Dangelmajer, Nutley, N. J., assignor to Resistoflex Corporation, Belleville, N. J., a corporation of New York No Drawing. Application June 29, 1945, Serial No. 602,401

4 Claims. (Cl. 260—36)

This invention relates to polyvinyl alcohol compositions.

Polyvinyl alcohol, as the term is used herein, refers to a group of closely related water-soluble compounds made by the saponification or hydrolysis of polyvinyl esters, particularly the acetate. The resulting products all possess the common characteristic of water solubility. They vary from one another, however, with respect to the degree of their water solubility, which depends in part on the extent to which the product is saponified. With respect to the latter, polyvinyl alcohols are broadly classified in the art into two groups known as "type A" and "type B."

Type A polyvinyl alcohols, within the group of water soluble products, will have saponification numbers from about 70 up to about 250, indicating that they are from about 92% to about 75% saponified, the differences between these percentages and 100% indicating the percentage of residual ester groups.

Type B polyvinyl alcohols are generally referred to as "completely saponified." Strictly speaking, this would mean that there were no residual ester groups, but as a practical matter this type designation refers to all polyvinyl alcohols which are at least 98.5% saponified (dry basis). Expressed in other terms, such products have a maximum saponification number of 18. The term quoted above where used in the claims is to be construed in the light of this explanation.

Both types of polyvinyl alcohol are produced in various degrees of viscosity or molecular weight.

In making formed articles of polyvinyl alcohol compositions, such as tubing, sheets, films, filaments and the like, plasticizers are usually employed to give the articles flexibility and resiliency or softness. Suitable plasticizers may include polyhydroxy compounds such as glycerol and certain glycols, amides such as formamide, acetamide and carbamide, derivatives thereof such as ethanol formamide and ethanol acetamide, and amines such as monoethanolamine and diethanolamine. Water is usually included and also serves as a plasticizer when combined with substances having the capacity to bind a certain amount of it in the composition. Various mixtures of plasticizers may be used to obtain particular qualities.

With all grades of polyvinyl alcohol there is a limit to the amount of plasticizers that can be incorporated without giving rise to exudation, especially in humid atmosphere, and this limit in many cases is below the point where the desired flexibility or softness is obtained. This is particularly true of the type B or "completely saponified" polyvinyl alcohols, which are less soluble generally and less retentive of plasticizers than the type A grades. The most difficult to plasticize are the high viscosity type B grades, yet these in other respects possess very advantageous properties which can be utilized if the problem of plasticizer retention can be solved.

One object of the invention is to increase the amount of plasticizers which can be used in polyvinyl alcohol compositions without giving rise to exudation and to provide an exudation inhibitor which makes possible the attainment of this object.

In the making of extruded articles of polyvinyl alcohol compositions it is absolutely essential that they possess proper flowing characteristics. It is frequently the case that compositions have all of the desired properties except the right degree of flowability and so an adjuvant which can be added to make the composition extrudable without affecting the other characteristics is of great utility. While it is often possible to achieve flowability in a given composition by changing the quantity or kind of plasticizers or solvents, this may result in the loss of some desired property, for example flexibility at low temperatures, which it is necessary to retain to meet the requirements of use.

Another object of the invention, therefore, is to provide an adjuvant which will improve the flowing characteristics of polyvinyl alcohol compositions without changing their other properties.

I have discovered that the foregoing objects are attained and that a flow aid and exudation inhibitor is provided in the use in polyvinyl alcohol compositions of tetrahydrofurfuryl alcohol ($C_4H_7O.CH_2OH$). The use of from about 5% to about 25% of this compound, based on the weight of polyvinyl alcohol, will, at the same time, and in proportion to the amount used, reduce or eliminate exudation in compositions subject thereto, increase the amount of plasticizers that may be incorporated before the exudation point is reached, and will impart the ability to flow under extruding conditions to those compositions lacking that ability and greatly augment the flowing properties of others, while leaving the other characteristics of the composition substantially unaffected.

The following specific example, illustrating the advantages to be derived from the use of the invention, is typical of a large number of tests of the material made with various types of polyvinyl alcohol and various plasticizers. A composition was prepared containing 100 parts of high viscosity completely saponified polyvinyl alcohol (type B), 40 parts of glycerol and 40 parts of water. The water and glycerol were mixed together and sprayed over the dry polyvinyl alcohol in a ribbon type mixer and then allowed to stand to improve the distribution of the plasticizer. This composition had very poor flow characteristics and could not be satisfactorily extruded. Formed articles made by molding exuded badly, showing poor retention of plasticizer. The addition of 20 parts of tetrahydrofurfuryl alcohol to the foregoing composition completely stopped exudation and gave to the composition flowing properties which made extrusion successful.

While the greatest advantages of the invention are to be had with type B polyvinyl alcohols, since they present the greatest problems as to flow and compatibility with plasticizers, the invention is of advantage with type A polyvinyl alcohols as well.

The amount of tetrahydrofurfuryl alcohol to be used for optimum results will vary according to the particular compositions in which it is used and simple tests will suffice to show the best proportions. From numerous tests it has been found that less than about 5% has little observable effect and that about 25% is the limit of compatibility with most grades of polyvinyl alcohol.

The foregoing detailed example is to be taken as merely illustrative and the invention is to be construed broadly within the purview of the claims.

What is claimed is:

1. A composition of matter comprising polyvinyl alcohol substantially free from residual ester groups, polyhydric alcohol plasticizer, and from 5% to 25% of tetrahydrofurfuryl alcohol, based on the polyvinyl alcohol.

2. A polyvinyl alcohol composition comprising, polyhydric alcohol plasticizer, and from 5% to 25% tetrahydrofurfuryl alcohol, based on the weight of polyvinyl alcohol.

3. A composition of matter comprising polyvinyl alcohol, water-soluble plasticizer for the polyvinyl alcohol, and from 5% to 25% of tetrahydrofurfuryl alcohol, based by weight on the polyvinyl alcohol.

4. A composition of matter comprising substantially completely saponified polyvinyl alcohol, water-soluble plasticizer for the polyvinyl alcohol, and from 5% to 25% of tetrahydrofurfuryl alcohol, based by weight on the polyvinyl alcohol.

CHARLES DANGELMAJER.